June 2, 1942.  M. SCHLUMBERGER  2,284,990
METHOD AND APPARATUS FOR ELECTRICAL PROSPECTING
Filed July 5, 1939  2 Sheets-Sheet 1
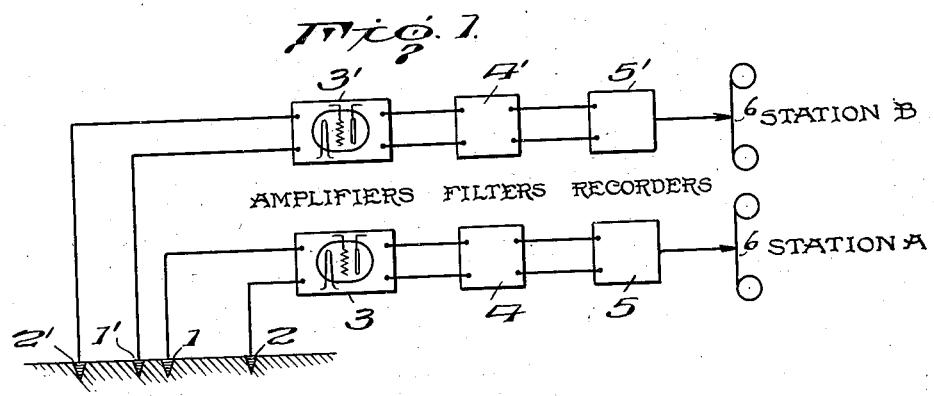
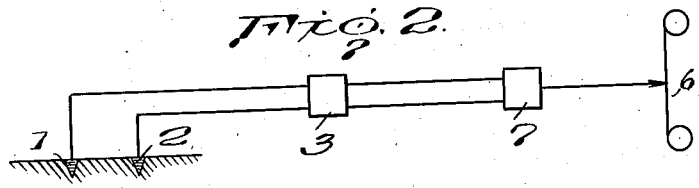
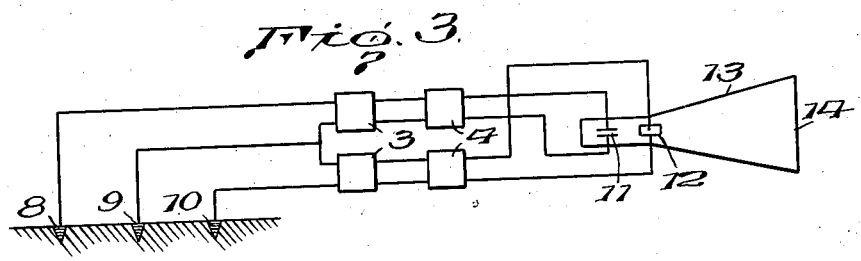
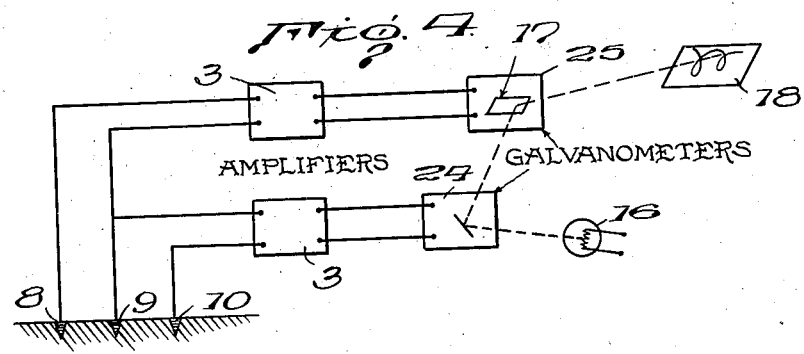
Inventor
M. Schlumberger
By Ben. J. Cromy
Attorney Inventor
M. Schlumberger
By Ben. J. Brown
Attorney Patented June 2, 1942

2,284,990

UNITED STATES PATENT OFFICE 2,284,990

METHOD AND APPARATUS FOR ELECTRICAL PROSPECTING

Marcel Schlumberger, Fabert-Paris, France

Application July 5, 1939, Serial No. 282,904
In Germany May 8, 1939

8 Claims. (Cl. 175—182)

The present invention relates to methods and apparatus for the electrical prospecting of the undersoil, of the kind in which only the field produced by currents flowing naturally through the ground, and called "telluric" currents, is utilized, excluding all artificial currents.

In a prior Patent No. 2,034,447, of March 17, 1936, a method of this kind was described. It was essentially characterized by the fact that, at different stations of the area to be surveyed, the telluric fields were studied at the same time, or the variations of the telluric field were studied, at these points between two given times.

This same method is utilized in the present invention, in which improvements are provided that make it possible to obtain information concerning the depth and thickness of various strata in the subsoil.

In a co-pending application Ser. No. 274,046 filed May 16, 1939, Patent Number 2,240,520, I have described an improvement to this method which consists in recording, at two different stations of the area to be surveyed, the curves described by a point the coordinates of which are proportional to the respective values, at each of said stations, of the components, along two axes of coordinates, of the telluric field at said point, the systems of coordinates being the same at the two stations.

An object of the present invention is to provide a method and apparatus for obtaining informations concerning the nature or the thickness of the various strata of the undersoil.

Another object of the invention is to provide a method and apparatus for recording variations of a predetermined frequency component, or of a band of frequency components, of the earth's telluric field, or of one of its time derivatives at each of two stations simultaneously.

Still another object of the invention is to provide a method and apparatus for recording variations of a predetermined frequency component, or band of frequency components, of the earth's telluric field, or one of its time derivatives along two directions or coordinates.

The invention is based upon the fact, found experimentally, that telluric currents constitute phenomena of variable period. Some kinds of oscillations of the telluric field have a period of several hours; other have much shorter periods (some seconds or even portions of seconds), these numerical values varying, of course, according to the region, the time of the day, and even the period of the year.

Experience also shows that the oscillations of short period remain localized in the superficial strata of the ground. The longer the period, the deeper the strata with which the oscillations correspond.

These data permit of determining the influence of the respective strata of the ground.

According to the essential feature of the present invention, I perform series of successive measurements in such manner that, for each series, only the telluric currents within a given range of frequencies are allowed to act.

Assuming that one knows, for the whole of a region, the electrical characteristics of the strata which constitute the undersoil, when the measurements have been performed at two stations, according to the methods above referred to (a fixed station and a movable station), it is possible to deduce from the results obtained by comparison of the various kinds of oscillations between the movable station and the fixed station, indications concerning the relative thicknesses of the respective strata.

When the telluric field is studied by means of the method set forth in my co-pending application the curve recorded at each station is obtained through the action of electrical means which may, in particular, include amplifiers and recorders, for instance galvanometers.

According to the present invention, these electrical means are adjusted in such manner as to be responsive only to frequencies ranging within certain given limits. For instance, when said electrical means include measurement galvanometers, the movable elements of said galvanometers have predetermined natural frequencies. Or, according to another embodiment of the invention, the electrical means comprises, included in the amplifiers or inserted ahead of the recorders, electrical filters which permit only a given band of frequencies to pass (these band-pass filters having, for instance adjustable limits).

Besides, it should be noted that the methods and apparatus of the present invention may be used advantageously in connection with the method set forth in the prior United States Patent No. 2,034,447 referred to above. In the disclosure of that patent, potentiometers are employed for making measurements of earth potentials according to a system therein disclosed. The utility of these measurements may be expanded by replacing the potentiometer of the prior patent with the frequency selective measuring apparatus described in the present disclosure.

According to another feature of the present invention, a frequency range of about a few hundredths of a cycle, or less, to about 30 cycles, or more, is utilized. For the oscillations of the highest frequencies, I preferably measure not the amplitudes themselves but the speeds of variation of these oscillations that is to say the gradients of the curves of the differences of potentials produced by the telluric currents between two electrodes as a function of time according to a method set forth in the prior U. S. patent. For this purpose, according to an embodiment of the present invention, I make use of a transformer, eventually with one or more stages of amplification of the telluric differences of potential. This embodiment of the invention has the advantage of making it possible to eliminate not only the telluric oscillations of low frequencies, but also a parasitic linear variation of difference of potential due for instance to an electric unstability of the grounding electrodes.

According to still another feature of the present invention, I make use of two transformer stages in series, so as to obtain the value of the second derivative, which is particularly characteristic of sudden variations of the telluric field, since this value is proportional to the curvature of the film records of the difference of potential as a function of time.

According to still another feature of the present invention, I simultaneously perform, in the course of a same recording, the analysis of the curve that is obtained by providing in parallel several electric filters each of which supplies indications corresponding to different respective bands of frequencies.

Other features of the present invention will result from the following description of some specific embodiments.

Preferred embodiments of the present invention will be hereinafter described with reference to the accompanying drawings, given merely by way of example and in which:

Fig. 1 is a diagrammatical view of a device for recording the amplitude of telluric oscillations as a function of time, with an electrical filter for eliminating one or several given ranges of frequencies;

Fig. 2 is a view of a device similar to the one of Fig. 1, using a galvanometer acting simultaneously as a recorder and a filter;

Fig. 3 is a diagrammatical view of an apparatus according to the invention, including a cathode ray oscillograph;

Fig. 4 is a diagrammatical view of an apparatus including two galvanometers, with optical recording means;

Figure 5:
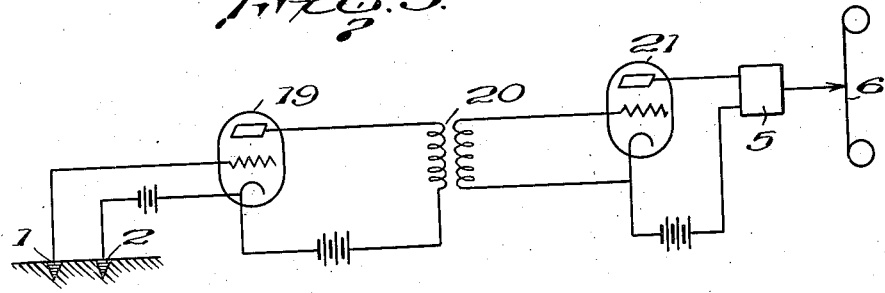
Figure 6:
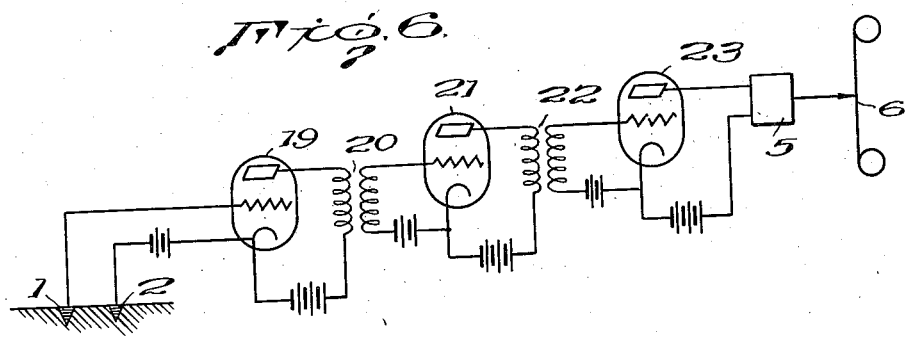

Fig. 5 diagrammatically shows a device arranged to record the derivative of said amplitudes;

Fig. 6 shows a device of the same kind for recording the second derivative.

Figure 7:
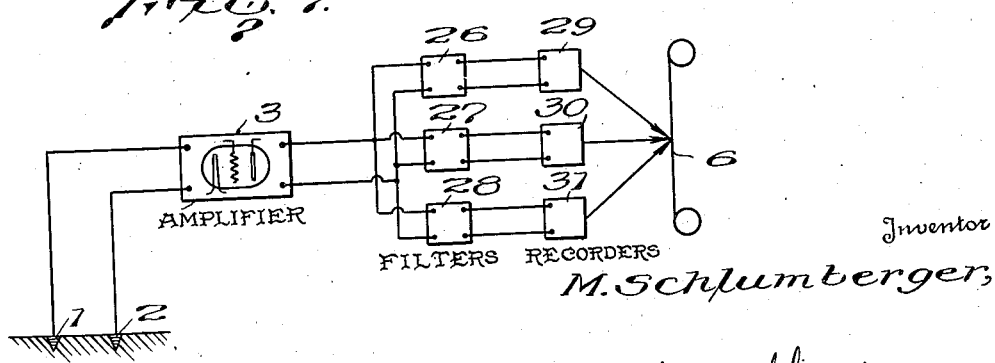

Figure 7 is a diagrammatic drawing of an apparatus according to the invention for simultaneously recording three different curves each of which is indicative of the amplitude of the telluric oscillations in a different frequency range.

The same references apply to the same elements throughout.

Fig. 1 shows in a very diagrammatic manner the recording of potential variations between two grounding means 1 and 2 at one station, and between grounding means 1' and 2' at a second station, according to the general method above set forth. The electrodes 1 and 2 are connected through amplifier 3, to filter 4 allowing only one or several given bands of frequencies to pass therethrough, and itself connected with a recording device 5 which traces the record, as a function of time, on a movable photographic band 6. Owing to the presence of filter 4, it is possible to study only the oscillations corresponding to strata of a certain depth. Likewise the electrodes 1 and 2' are connected to the input of amplifier 3', the output of which is connected to the filter 4', which in turn is connected to the recorder 5' for recording on the strip 6'.

These filters 4 and 4' may be high-pass or low-pass or band pass filters, and they may be placed before amplifiers 3 and 3' respectively or incorporated with them between two of the respective amplifier stages. The cut off frequencies of these filters are preferably adjustable.

When the voltages along two coordinates are to be recorded at each of the two stations, four sets of apparatus will be used, instead of the two sets shown in Fig. 1.

The device of Fig. 2 is similar; a recording galvanometer 7 is substituted for the filter 4 and recorder 5; owing to the natural period of oscillation of the movable elements of the galvanometer, practically only frequencies corresponding to that natural period are recorded on the movable band 6.

The apparatus shown in Fig. 3 is for use in connection with the method set forth in my above co-pending application. Three electrodes 8, 9 and 10 are placed in the ground at a station, at the apices of a triangle, preferably a right-angled triangle. The differences of potential produced by the telluric current between 9 and 8 and 9 and 10 are fed to amplifiers 3 and filters 4, which permit only a same given range of frequencies to pass therethrough. The output terminals of said filters 4 are connected with the respective pairs of plates 11 and 12 (one of which is perpendicular to the plane of the drawing) of a cathode ray oscillograph 13.

The working of such an oscillograph is well known in the art and need not be described here. It suffices to say that the cathode ray spot moves on the fluorescent screen on the end face 14 of the tube along a curve the coordinates of which are proportional to the differences of potential produced between 9 and 8, and 9 and 10, respectively, by the telluric currents. As the filters only permit frequencies within the same given band to pass to the oscillograph, it is possible to study separately the oscillations corresponding to different strata of the ground. The curve is recorded on a photographic paper or plate placed on the end face 14.

The embodiment of Fig. 4 relates to the same method of studying the telluric field. In this case the difference of potential existing between two of the electrodes, say 9 and 8, produces a deviation of a galvanometer 24 the movable mirror 15 of which turns about a vertical axis of rotation. The difference of potential existing between one of these electrodes, for instance 9, and a third electrode, say 10, produces a deviation of another galvanometer 25 the mirror 17 of which is adapted to pivot about a horizontal axis.

A light ray, emitted from a source 16, strikes mirror 15, from which it is reflected on mirror 17, which in turn reflects it on a fixed photographic plate 18.

In this case, according to the present invention, the movable elements of the galvanometers have the same given natural frequencies so that they do not respond to frequencies differing substantially from said natural frequencies.

With the embodiment illustrated by Fig. 5, the electrodes 1 and 2 are connected with a thermionic tube 19, the output circuit of which includes the primary winding of a transformer 20. The secondary of this transformer is connected to the grid of another tube 21 the plate circuit of which is connected with a recording device 5.

The grids of tubes 19 and 21 are suitably biased so that there is substantially no grid current. It is known that the voltage induced through the terminals of the secondary of transformer 20 is then proportional to the derivative with respect to time of the current flowing through the primary of the transformer so that with this arrangement, said device records the derivative, with respect to time, of the amplitudes of the telluric oscillations.

The amplitude of the derivative is, of course, greatest when the telluric field is changing most rapidly, and the transformer passes on voltages which are derived from the more quickly changing fields. It therefore acts as a frequency selective device.

In the embodiment of Fig. 6, there are two such transformers 20 and 22 in series, and a third tube 23 so that the device 5 records the second derivative.

Thus the plate current $I_{pl}$ of the first tube 19 flows through the primary of the transformer 20 and induces in the secondary a voltage $M_{20} dI_{pl}/dt$. The plate current of the second tube 21 will be proportional to the voltage across the secondary of the transformer 20. The voltage induced in the secondary of the transformer 22 and applied to the grid of the tube 23 will then be of the form $$KM_{22}\frac{d}{dt}\left(\frac{dI_{pl}}{dt}\right) = KM_{22}\frac{d^2 I_{pl}}{dt^2}$$

in which K is a constant of proportionality and $M_{22}$ is the mutual inductance between the windings of the transformer 22. It is thus evident that the voltage impressed upon the grid of the tube 23 is proportional to the second derivative of the current flowing in the plate circuit of the tube 19, which is, in turn, proportional to the voltage impressed across the electrodes 1 and 2.

Figure 7 shows a form of the invention in which the apparatus at each station is provided with several sets of frequency-selective filters and recorders. The voltage at one station is picked up by the electrodes 1 and 2 and impressed upon the amplifier 3, the output of which is connected to the filters 26, 27 and 28 in parallel. Each of these filters passes a different range of frequencies and each is connected to a separate recording device indicated by 29, 30 and 31. These devices trace separate curves on the film 6. In this way, the electric field of the telluric currents can be broken down or analyzed, so as to show the way in which its energy is distributed over several ranges of frequency. While three ranges have been illustrated, more, of course, may be employed if desired.

The various forms of the invention which have been described make it possible to determine the amplitude of telluric oscillations in any frequency band or bands which may be desired, and since it has been found by experience that the oscillations of shorter periods are localized in the superficial strata, while those of longer period occur in deeper strata, a study of the curves will show the approximate depth of the strata to which the oscillations correspond.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. A system for the electrical prospecting of the undersoil which comprises, in combination, at least two grounding means, recording means, electrically connected with said grounding means, for recording variations of the potential difference between said respective grounding means, and additional means, associated with said recording means, for preventing telluric oscillations of frequencies ranging within at least one band from influencing said recording means.

2. A method of electrically prospecting the undersoil which comprises recording, at each of two stations located both with the area to be surveyed, the components, along two axes of coordinates, of the telluric field at said station, the coordinate systems being the same at both stations, and simultaneously eliminating at least one given range of frequencies of variation of the telluric currents.

3. A method of electrically prospecting the undersoil which comprises recording simultaneously, at two different stations of the area to be surveyed, the respective curves each described by a point the coordinates of which are proportional to the respective values, at each of said stations, of the components, along two axes of coordinates, of the telluric field at said station, the systems of coordinates being the same for both stations, and simultaneously eliminating at least one given range of frequencies of variation of the telluric currents.

4. A system for the electrical prospecting of the undersoil which comprises, in combination, at least two grounding means, means electrically connected with said grounding means for recording variations of the potential difference between said respective grounding means, and filter means, associated with said recording means, for preventing telluric oscillations of frequencies ranging within at least one band from influencing said recording means.

5. A system for the electrical prospecting of the undersoil which comprises, in combination, at least two grounding means, means, electrically connected with said grounding means, for recording variations of the potential difference between said respective grounding means, said recording means including at least one galvanometer, the movable means associated with said galvanometer having a predetermined natural frequency so as not to respond to oscillations of a frequency differing substantially from said natural frequency.

6. A system for recording the variation with time of a characteristic of an electric field in the earth's surface caused by telluric currents, comprising earth electrodes placed at a given station in said telluric field, frequency selective means connected to said electrodes, means responsive to a particular characteristic of said telluric field, and means for recording the variations in said characteristic over a period of time at said station.

7. A system for the electrical prospecting of the under soil, which comprises, in combination, at least two ground electrodes for picking up telluric potentials, frequency selective means responsive to the first time derivative of said picked up telluric potentials, and means for recording said derivative as a function of time.

8. A system for the electrical prospecting of the under soil which comprises, in combination, at least two ground electrodes for picking up telluric potentials, frequency selective means responsive to the second time derivative of said picked up telluric potentials, and means for recording said second derivative as a function of time.

MARCEL SCHLUMBERGER.